United States Patent
Hua et al.

(10) Patent No.: US 7,668,301 B2
(45) Date of Patent: Feb. 23, 2010

(54) SIMULATED USER CALLING TEST SYSTEM AND METHOD WITH BUILT-IN DIGITAL SPC-EXCHANGE

(75) Inventors: Xinhai Hua, Shenzhen (CN); Bo Huang, Shenzhen (CN); Kun Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 126 days.

(21) Appl. No.: 10/581,326

(22) PCT Filed: Jun. 22, 2004

(86) PCT No.: PCT/CN2004/000666

§ 371 (c)(1),
(2), (4) Date: Jun. 1, 2006

(87) PCT Pub. No.: WO2005/055574

PCT Pub. Date: Jun. 16, 2005

(65) Prior Publication Data

US 2007/0116188 A1     May 24, 2007

(30) Foreign Application Priority Data

Dec. 1, 2003   (CN)  ........................ 2003 1 0115559

(51) Int. Cl.
*H04M 1/24* (2006.01)
*H04M 3/08* (2006.01)
*H04M 3/22* (2006.01)
(52) U.S. Cl. ................. 379/29.02; 379/1.01; 379/27.04
(58) Field of Classification Search ................ 379/1.01, 379/9, 10.01–10.03, 26.02, 27.02, 27.04, 379/29.02, 29.1, 31
See application file for complete search history.

(56) References Cited

U.S. PATENT DOCUMENTS 5,838,767 A * 11/1998 Aoyama ................... 379/15.01

(Continued)

FOREIGN PATENT DOCUMENTS

CN     1306360 A     8/2001

(Continued)

OTHER PUBLICATIONS

International Preliminary Report on Patentability for PCT/CN2004/000666 mailed Jun. 7, 2006.

(Continued)

*Primary Examiner*—Quoc D Tran
(74) *Attorney, Agent, or Firm*—Sutherland Asbill & Brennan LLP

(57) ABSTRACT

The present invention disclosed a kind of simulate user calling's test system and method which built-in digital SPC exchange, include background processing module, foreground calling control processing module and hardware subsystem, therein: background processing module operation on exchange servicing platform, for supply user setting parameter and display operate interface for test result, foreground calling control processing module is include in the exchange main control module, for control said hardware subsystem execute test process according to designed logical flow and user mount parameter, hardware subsystem composed of loop circuit relay single board, simulation user interface board, interface board control processing unit, multifunction resources process board. Adopt present invention may use few cost to reach the test result which equal to commercial calling device, and may reach more mobility, reach inline test function.

6 Claims, 5 Drawing Sheets

U.S. PATENT DOCUMENTS

| | | | |
|---|---|---|---|
| 6,529,583 B2 * | 3/2003 | Creamer et al. | 379/10.03 |
| 6,826,259 B2 * | 11/2004 | Hoffman | 379/10.03 |
| 2002/0122538 A1 | 9/2002 | Ludeman | |
| 2002/0196925 A1 * | 12/2002 | Yamazaki et al. | 379/226 |
| 2004/0008825 A1 * | 1/2004 | Seeley et al. | 379/32.01 |

FOREIGN PATENT DOCUMENTS

| | | |
|---|---|---|
| DE | 19744412 A1 | 4/1998 |
| DE | 19807532 A1 | 8/1999 |
| JP | 57210755 A | 12/1982 |
| JP | 7-143530 A | 6/1995 |
| JP | 7-250157 A | 9/1995 |

OTHER PUBLICATIONS

English translation of International Preliminary Report on Patentability for PCT/CN2004/000666 mailed Jun. 7, 2006.
Supplemental European Search Report for PCT/CN2004/000666 dated Mar. 20, 2009.

* cited by examiner

SIMULATED USER CALLING TEST SYSTEM AND METHOD WITH BUILT-IN DIGITAL SPC-EXCHANGE

CROSS REFERENCE TO RELATED APPLICATION

This application claims the priority benefit of PCT/CN2004/000666 filed on Jun. 22, 2004.

TECHNICAL FIELD OF THE INVENTION

The present invention relates to the digital stored program control (SPC) switch technique in telecommunication, particularly, to a simulated user call test system built-in digital SPC switch and method thereof.

BACKGROUND OF THE INVENTION

Currently, the simulated user calling performance test for digital SPC switch mainly employs large traffic call test instruments. In the market, there are a lot of commercial simulated user calling test instruments to be selected. Such test instrument is characterized in simulating the calling process of actual user realistically, in which the test is performed by transmitting and receiving pass detecting tone and judging the pass detecting tone while a call is initiated on an user line, a dial is simulated and the called is communicated, and, therefore, it can realistically reflect the processing on calls by the switch system and its performance on the call processing. However, they are not applied in many institutes because of their high prices. Therefore, in the actual operation of a network, branches of many operators do not buy this kind of equipment, and, consequently, calling tests are very complicated during pass tests of many digital SPC switches. If there is a calling test instrument built-in the switch, the test will be simpler.

In the China patent application No. 99116068.1, a simulating caller is disclosed, in which its all parts are installed in a switch. This patent application realized an independent simulated calling test instrument, which can not be built in digital SPC switch system.

In actual application, there has already been a kind of switch with a built-in large traffic calling test system, in which it is characterized in that it designs a virtual calling process on a user element processor, simulating the whole process including initiating a call by a user and answering by the called user the call. But the main disadvantage of this kind of system is that it can only realistically test the process of call signaling by the main control system in the tested switch, but not the performances such as the hardware interface performance in the switch and the performance of the switch connection path, and actually, it can not accurately reflect the call process performance of the switch system.

SUMMARY OF THE INVENTION

The technical problem to be solved by the present invention is to provide a simulated user call test system located within a digital SPC switch, and to provide a test method based on built-in modules of a digital SPC switch, in which equal functions to commercial external call test systems can been realized with a lower cost by using the current hardware and software resources in a digital SPC switch.

In order to approach the above object, the present invention provides a simulated user call test system built in a digital SPC switch, which comprises a back process module, a front call control process module and a hardware subsystem for performing a call test, in which:

the back process module runs on a maintaining platform of the switch for providing an operation interface for a user to perform a call test setup, receiving call test result data transmitted by the front call control process module, and performing display and statistic process;

the front call control process module is included in a main control module of the switch for receiving call test setup parameters provided by the back process module, controlling the hardware subsystem to perform a call test process according to a flowchart and user parameters set, and reporting a call test result to the back process module;

the hardware subsystem comprises function process units of the digital SPC switch for receiving instructions from the front call control process module, performing test including picking-up or hanging-up a phone, detecting signaling tone, dialing, sending test tone, and talking, and reporting test results to the front call control process module.

In order to realize the above objects, the present invention further provides a test method on the basis of built-in modules of a digital SPC switch, which comprises the following steps of:

setting related information for a calling and a called user in a simulated call test through a human-machine interface of a back process module by a tester;

transmitting call parameters to a front call control process module through a message channel by the back process module;

initiating the call test after the front call control process module obtains related call test process parameters;

sending, by the front call control process module, instructions to a hardware subsystem within the switch according to a call test control flowchart set;

completing the test process according to the instructions from the front call control process module, and reporting a test result to the front call control process module by the hardware subsystem;

processing the call test result, and collecting to the back process module by the front call control process module;

displaying the result by the back process module.

The above test method is characterized in that the call test control flowchart comprises the following steps of:

(1) first simulating picking-up a phone by a user in an idle state, and entering a state of waiting for dial tone;

(2) after detecting the dial tone, preparing for sending the number, and entering a state of dial;

(3) sending the number called in a dial tone multi frequency (DTMF) or dial pulse (DP) form according to a setup, after sending the number, initiating a pass detection timer, and entering a state of waiting for pass;

(4) receiving the number, analyzing the number, searching for a called user, and feeding ringing back tone by a normal call service system in the switch;

(5) if the called user picks up a phone when detecting the ringing, sending a pass test tone and setting the pass detection timer, and entering a state of a pass test;

(6) after the calling user receives the pass test tone, sending another pass test tone, and, if the calling user is set first to hang up, setting a talk timer, if not, detecting whether there is a busy tone, and, entering a state of talking;

(7) after the called user receives the pass test tone, if the calling user is set first to hang up, detecting whether there is a busy tone, if not, setting a talk timer, and entering a state of talking;

(8) when the talk timers of the calling or called users time out or after a busy tone is detected, simulating user hanging up, and releasing the calling and the called users, thereby a call process is completed.

In the above flowchart, when sending the number, a dial timer is initiated to control the speed of dial, that is, the time interval of digits of the called number, and the time length of the timer can be set. Furthermore, because the procedure is processed based on circuits (one circuit represents one telephone), and each circuit may use a different form to dial (DTMF or DP), after timing out of the timer for each circuit, it first judges the attribute of the circuit before sending the dial, the dial for each time is one digit of the number called. Because the first digit of the number is also transmitted after timing out of the timer, actually, all digits have been judged.

In the above flowchart, when the pass detection timer of the calling or called user time out, it continues the next talking step as the same manner as when detecting the pass test tone. Because the pass detection in calling is bi-directional, no-pass to one direction does not mean no-pass to another direction, so that a waiting time can be reserved for the pass detection for another direction, and, further, the failure in pass detection only means no-pass in the calling path, and may have no relation to whether the signaling is normal or not (for example, any failures in hardware in the channel). Therefore, it can continue to go on and the remaining signaling flowchart may be tested in the remaining steps, which results in more accurately locating on the failures.

From the above, compared to the prior art, the present invention realizes a test system for simulating user large traffic call built in a digital SPC switch, which has the same function as commercial outside call testers, on the basis of original SPC switch equipments and current resources utilized by adding a call test process and necessary alternative hardware process modules to the switch control process software system. The present invention has the following advantages: (1) the system is wholly built in the switch system, users can obtain such system with less cost when buying a switch system; (2) the call test result is equal to the standard commercial call tester, and easier to use; (3) because the test system is built in a digital switch system, the simulated user call test system can be used as an on-line call test system in a switch system by setting, which helps to find any fault on call function of the system immediately.

DETAIL DESCRIPTION OF EMBODIMENTS

Simulating a user call process mainly includes operations, such as picking up a phone, hanging up the phone, listening to signal tone, dialing the number called, and talking. As a simulated user call test system, its main function is to finish the above operations, and to analysis the result. The present invention accomplishes a simulated user call test system in a digital SPC switch by employing functions, such as simulating user picking up and hanging-up a phone and dialing the number called, of loop relay in the digital SPC switch, by employing functions existing in a switch such as control process and signal tone detection, and by adding certain proper software. The call test system of one embodiment according to the present invention includes the front and back software process modules and hardware subsystem, with a system structure shown in FIG. 1, which comprises the following three parts:

The first is the back process module 11, which runs on a maintaining platform of a switch for providing the call test system with a human interface, with its main function as providing user operation interface and displaying call test result. Users can perform call test setup via the human-machine interface. During the call test process and after the end of the call test, the front call control process module transmits the call test result data to the back process module in a real-time manner to display and perform related data statistic process.

The second is the front call control process module 12, which presents as a function module in the main control process module of the switch, and in the realization, it is a task having call test process control process for the main control software system of the switch. It receives related call test parameters set by a user through the back platform of the call test system, controls the hardware subsystem for performing a call test, performs call test process according to logic flowchart designed and related parameters set by the user, and reports the result of call test to the back process module of the call test system. The front call control process module is a core of the whole call test system, responsible for managing resources used in the call test. The front platform also has a call service process module of a normal calling, for processing normal service functions of the switch.

The third is the hardware subsystem 13 for performing call test, which mainly comprises some function process elements of a digital SPC, and is a key part to accomplish a simulated user call test. The test function of the simulated user call test system is finally realized based on the hardware subsystem. The hardware subsystem receives all instructions from the front call control process module, dispatches hardware resources managed, performs specified test items, and reports the test result to the front call control process module.

Figures 1, 2:
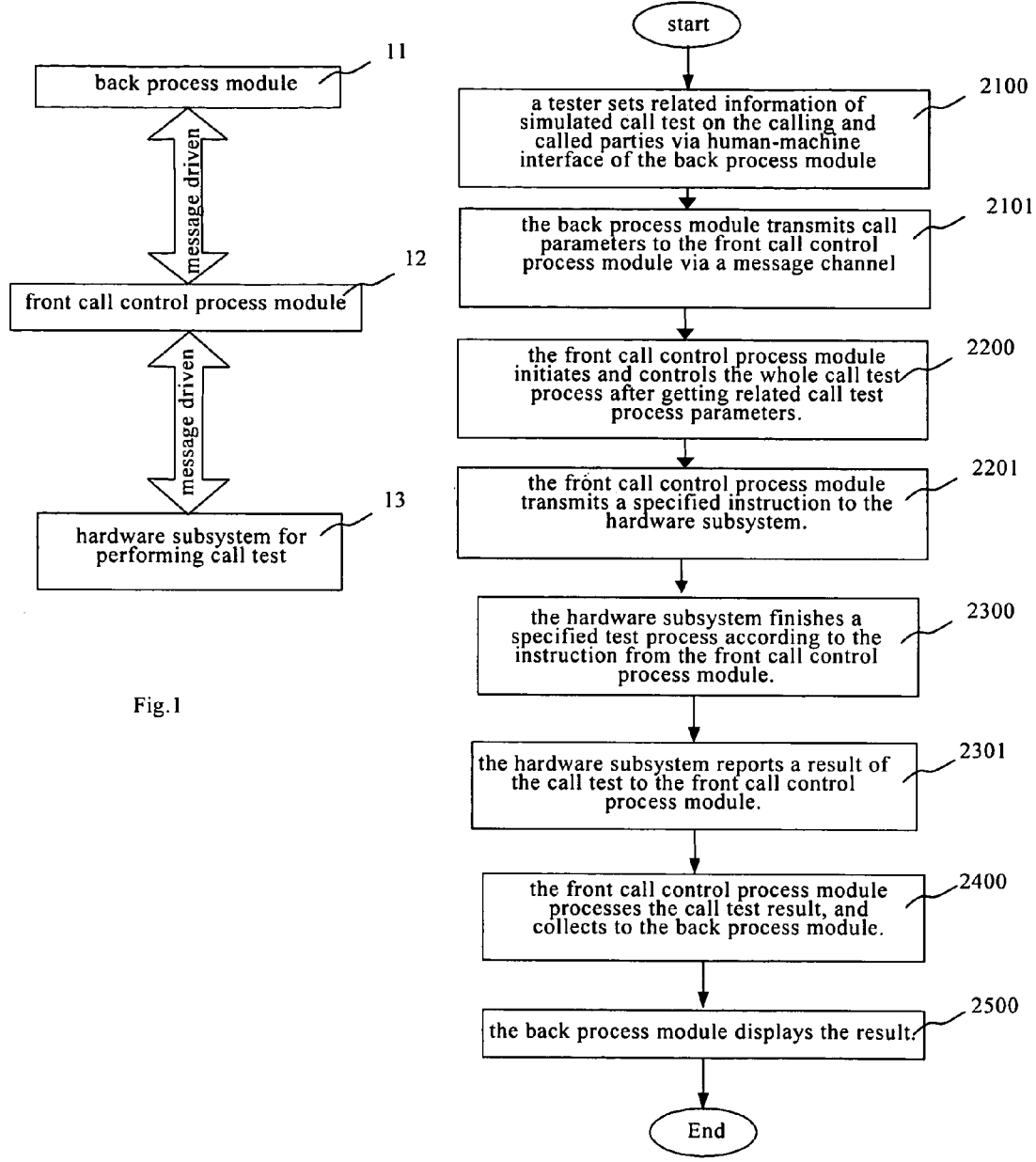
FIG. 1 is a schematic view of a built-in simulated user call test system according to the present invention.
FIG. 2 is an overall flowchart of a simulated user call test system of the present invention.
Figure 4A:
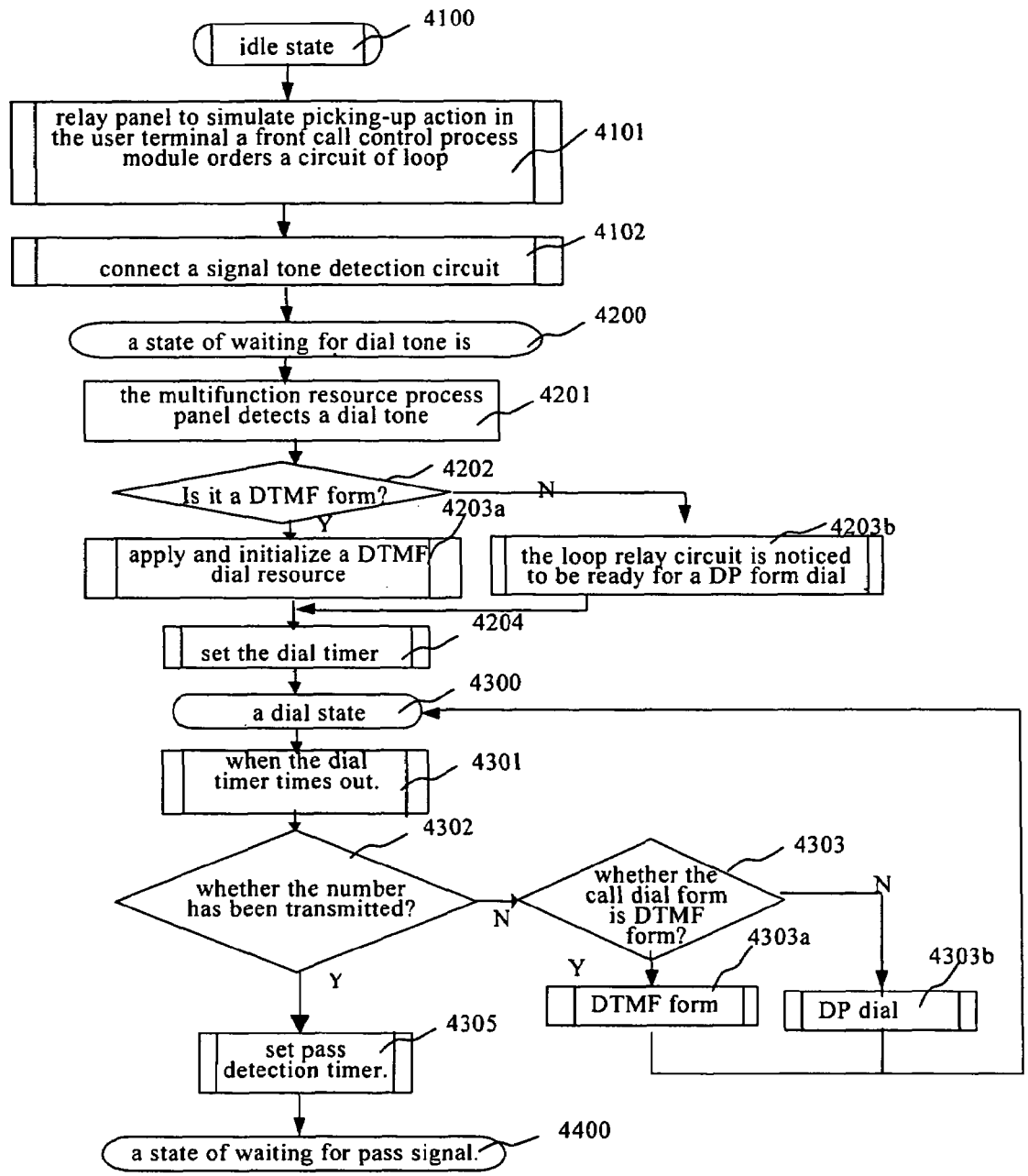
FIGS. 4A and 4B are a flow chart of a test process at the calling side in the front main control software of the built-in simulated user call test system according to one embodiment of the present invention.
Figure 4B:
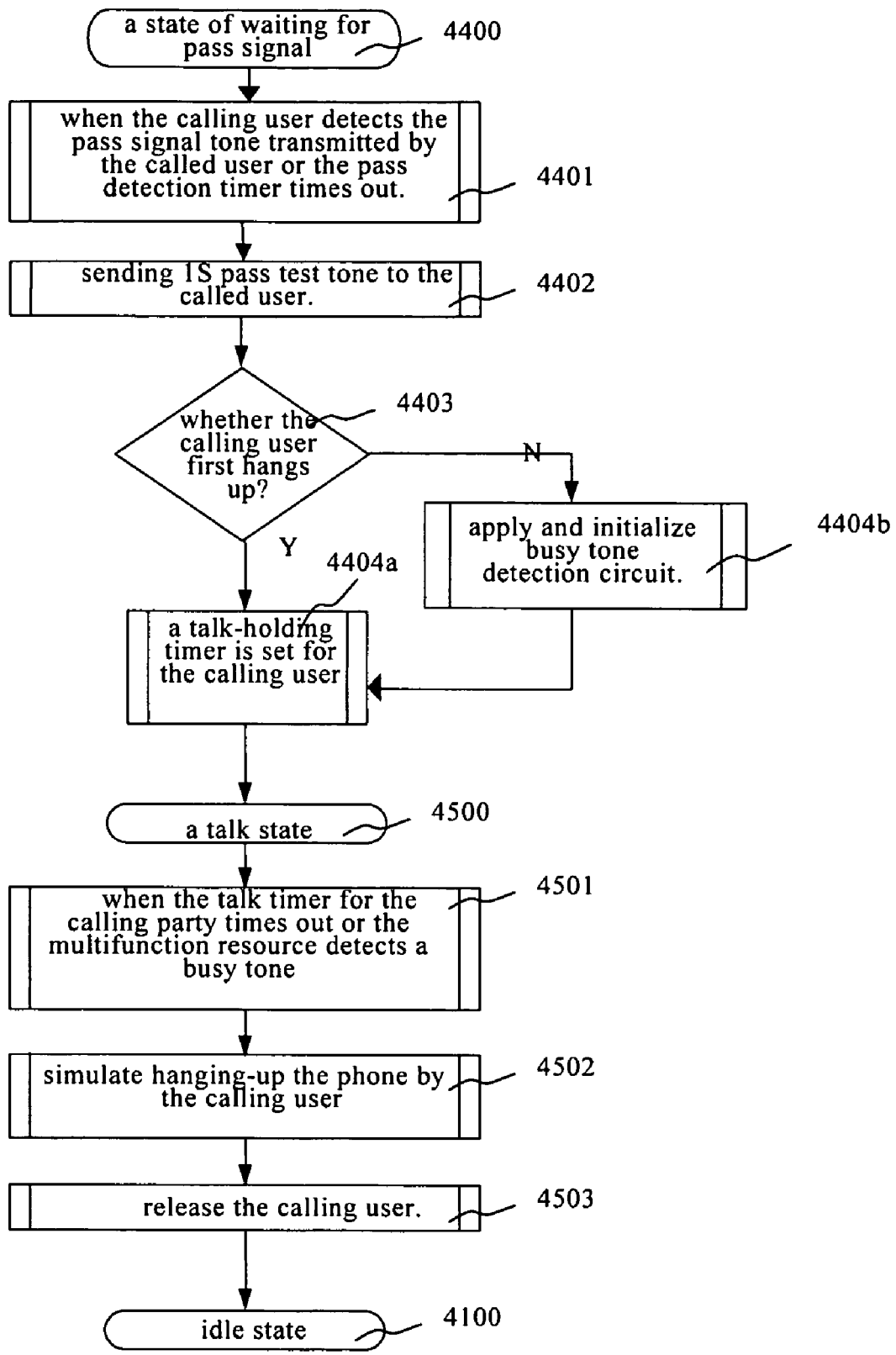
Figure 5:
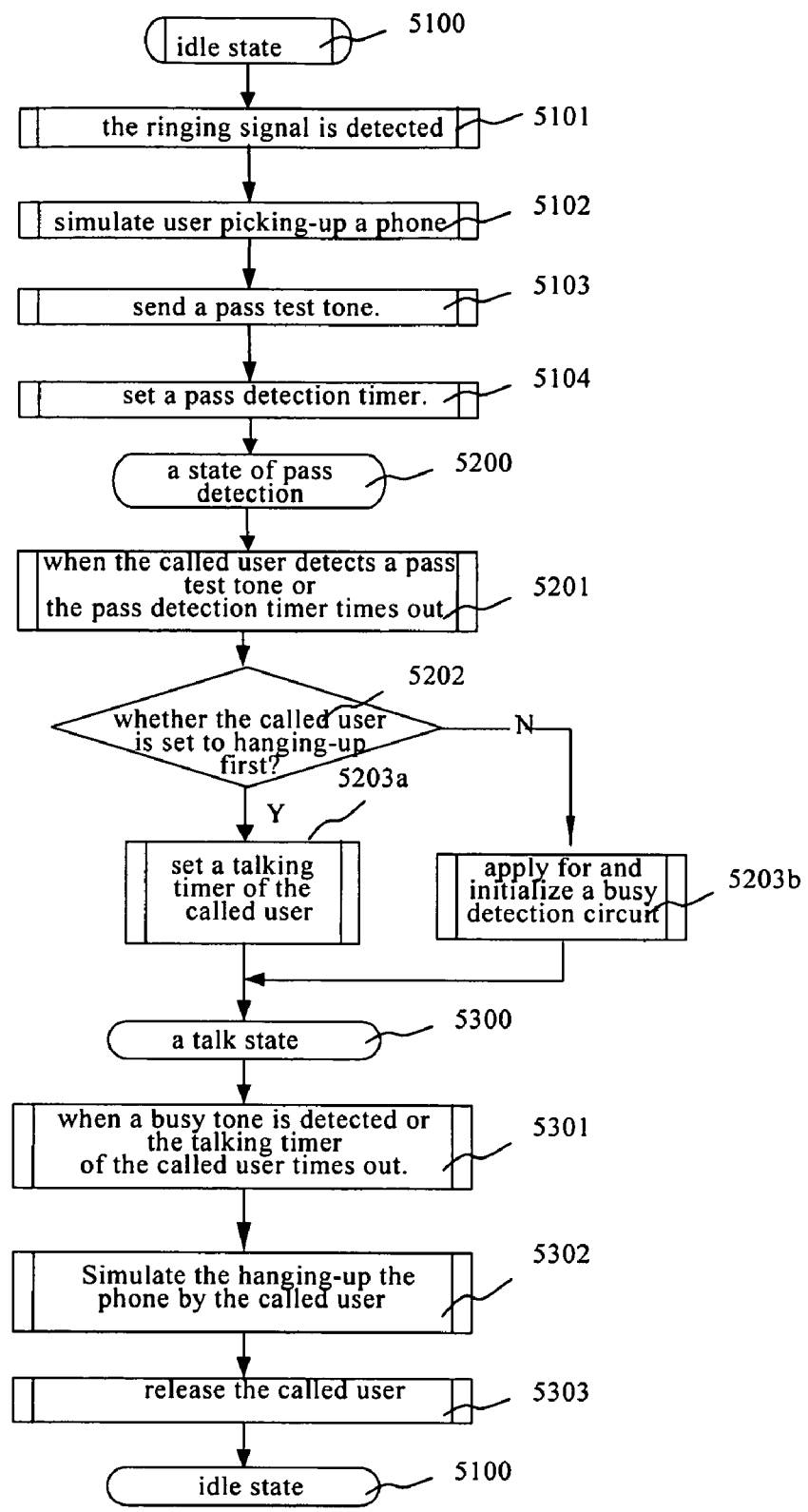
FIG. 5 is the flow chart of a test process at the called side in the front main control software of the built-in simulated user call test system according to one embodiment of the present invention.

The whole flow chart of the test method of the present invention is shown in FIG. 2, including the following steps of:

step 2100, in which a tester sets related information of simulated call test on the calling and called parties via the human-machine interface of the back process module; these setups include information, such as location of the calling user, the number called, the call interval, the time length of call-holding, dial form, dial interval, the calling user first hanging-up or the called user first hanging-up.

step 2101, in which the back process module transmits call parameters to the front call control process module via a message channel;

step 2200, in which the front call control module initiates and controls the whole call test process after getting related call test process parameters; the front call control process module is a core process module of the simulated user call test system, with a basic flow chart of the call test shown in FIG. 4A, FIG. 4B and FIG. 5.

step 2201, in which the front call control process module transmits a specified instruction to the hardware subsystem;

step 2300, in which the hardware subsystem finishes a specified test process according to the instruction from the front call control process module;

step 2301, in which the hardware subsystem reports a result of the call test to the front call control process module;

step 2400, in which the front call control process module processes the call test result, and collects to the back process module;

step 2500, in which the back process module displays the result, and meanwhile the tester may further perform statistic on the related data when desired.

The configuration and basic flow chart of the hardware subsystem of the call test according to the present invention will be explained in details below.

Figure 3:
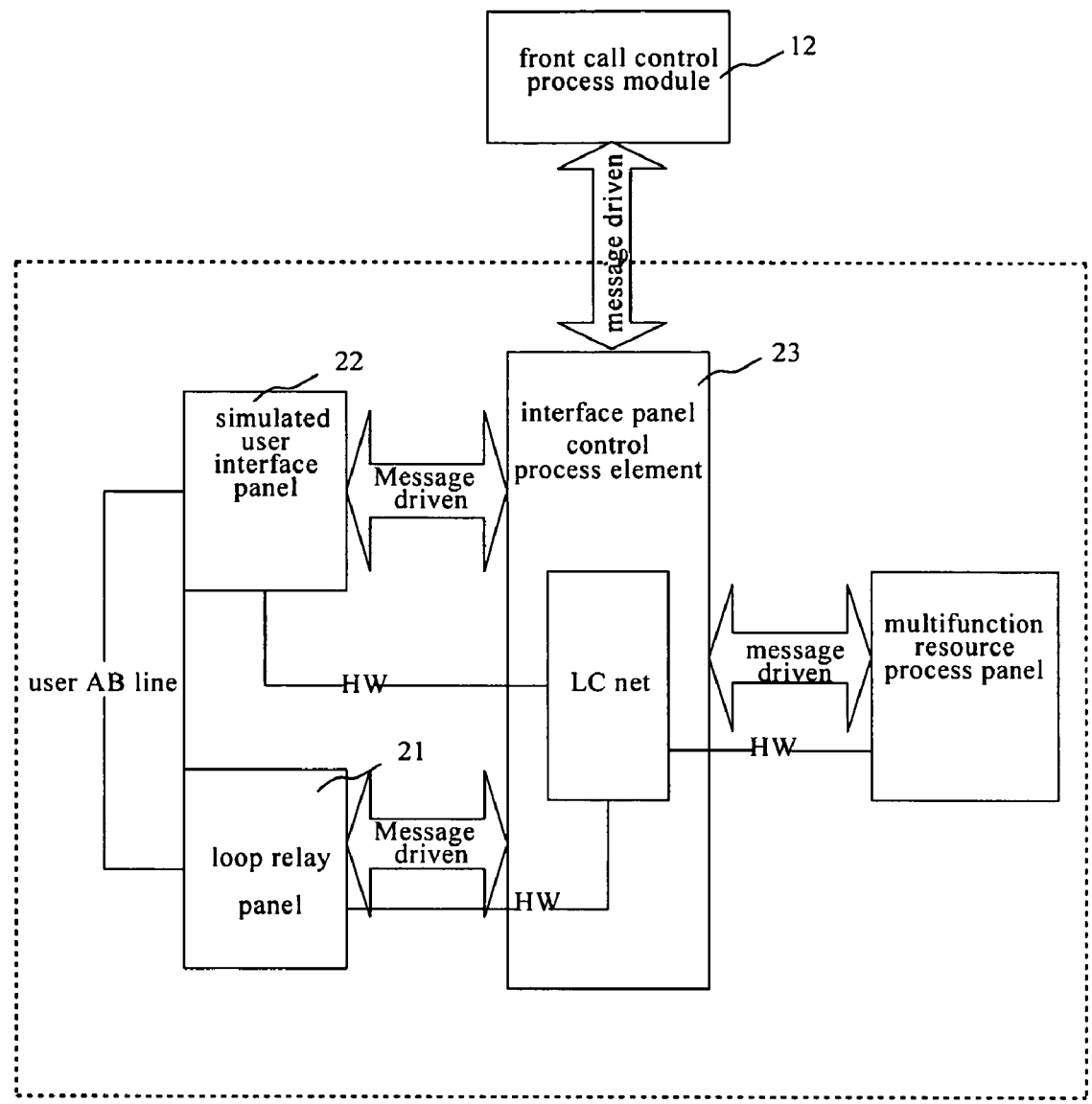
FIG. 3 is a schematic view of the hardware structure for a built-in simulated user call test system according to one embodiment of the present invention.

The configuration of the hardware subsystem of the call test in one embodiment according to the present invention is shown in FIG. 3, comprising loop relay panel 21, simulated user interface panel 22, interface panel control process element 23, and multifunction resource process panel 25.

Loop relay interface is used for simulating picking-up or hanging-on a phone in the calling or called user terminal and dial function of a DP form by the calling user;

The multifunction resource process panel includes:

a signal tone detection process module for detecting whether tones, such as the dial tone and busy tone, in the switch are normal or not in the call test process, in order to perform the next call test process step;

a signal tone process module for providing playing of signal tones required in the call test process, for example, sending pass test tone; and a dual tone multiple frequency generator for simulating a dial function of user terminal in a DTMF form;

it should be noted that, there are many functions to be applied on the multifunction resource panel, as described above, and busy tone detection and DTMF dial function are not initiated during normal call process, which needs to be initialized before test.

Simulated user interface panel connects to loop relay panel by user AB line, for providing simulated user interface in the switch, and initiating call on user line when testing; and interface panel control process element is connected to the loop relay panel, simulated user interface panel and multifunction resource process panel with highway (HW) wires, on which inter-working and exchanging is completed by time division switch network LC, and the control between the front call control process module and all hardware above is realized in a message-driven form by the interface. Timers in the process, such as timers for dial, pass detection, and talking, are set on the interface control process element according to the parameters transmitted from the front call control process module, and the parameters can be manually modified via the back process module.

The above simulated user interface panel, interface panel control process element, and multifunction resource process panel all are intrinsic parts of a digital SPC switch, and only loop relay panel is the alternative part in the digital SPC switch, but it is a developed part and can be used directly, and, when necessary, it can be added only. All above hardwares support their functions necessary in the test, but their process flow chart in a normal call may not comply with the process flow chart in the test, which needs to modify the software only.

It should be noted that, because of continuous development, update and modification on hardware resources in a SPC switch, the present invention does not limit the unit realizing the hardware subsystem to the above specified hardware panel, which is only a preferred embodiment.

From the above, it can be seen that the hardware subsystem and software systems of front and back processes in this embodiment of the present invention may be added to the digital SPC switch system in an overlap form, which does not influence original functions of the switch, such as service call.

Next, in connection with FIGS. 4A, 4B and 5, it will describe the combination of the front and back call control process modules and hardware resources in the call test system, and the basic service flowchart for processing a call test process.

A calling user is in idle state, step 4100;

a front call control process module orders a circuit of loop relay panel to simulate picking-up action in the user terminal, step 4101;

the loop relay circuit and a signal tone detection circuit on a multifunction resource process panel are connected, step 4102;

a state of waiting for (the calling user's) dial tone is entered, step 4200;

the multifunction resource process panel detects a dial tone, step 4201;

the front call control process module judges whether call dial form of the simulated user manually set is a DTMF form or not, if yes, perform step 4203*a*, if not, perform step 4203*b*, and step 4202;

a DTMF dial resource on the multifunction resource process panel is applied and initialized, preparing for dial, step 4203*a;* if the dial form is indicated to be set as a DP form, the loop relay circuit is noticed to be ready for dial, step 4203*b;* meanwhile, the dial timer is set, step 4204;

a dial state is entered, step 4300;

when the dial timer times out, step 4301;

the front call control process module judges whether the number has been sent, if yes, perform step 4305, if not, perform the next step, step 4302;

whether the call dial form set by user is DTMF form or not is judged, if yes, perform step 4-304*a*, otherwise, perform step 4304*b*, step 4303;

the front call control process module controls a DTMF dialer on the multifunction resource process panel to dial, and returns step 4300, 4304*a.* the front call control process module controls the circuit of loop relay panel to perform DP dial, and returns step 4300, step 4304*b;* a pass detection timer is set, step 4305;

then, the calling user enters a state of waiting for a pass signal from the called user (which will be introduced continuously below), and a normal call service system of the digital SPC switch receives the number and analyzes it, locates the called user, and feeds ringing back tone to the called user;

the following is a control process in a simulated user terminal:

the loop relay of a simulated called user detects ringing signal of user line in real time manner, in idle state, step 5100;

the ringing signal is detected, step 5101;

the front call control process module controls the loop relay panel to simulate user picking-up a phone, step 5102;

a pass test tone of 450 Hz is sent to the calling user, step 5103;

a pass detection timer is set, step 5104;

the caller user is entered a state of pass detection, step 5200;

when the called user detects a pass test tone or that the pass detection timer times out, step 5201;

whether in the simulated call the called user is set to hanging-up first is judged, if yes, perform step 5203a, if not, perform step 5203b, step 5202;

a talking timer of the called user is set, step 5203a;

the front call control process module applies for and initializes a busy detection circuit on the multifunction resource process panel, and starts to detect any busy tone in real time, step 5203b;

the called user enters a state of talking, step 5300;

when a busy tone is detected or the talking timer of the called user times out, step 5301;

the front call control process module controls the loop relay panel to simulate the hanging-up the phone by the called user, step 5302;

after the simulated user interface panel detects the hanging-up, a normal call service flowchart in the switch releases the called user, step 5303; the called user is entered an idle state, that is, back to step 5100.

The control process in the simulated user terminal for the calling user is continuously described below:

the calling user is in a state of waiting for pass signal from the called user, step 4400;

when the calling user detects the pass signal tone transmitted by the called user or the pass detection timer times out, step 4401;

sending 1S pass test tone to the called user, step 4402;

whether in the simulated setup the calling user first hangs up is first judged before the talk state is entered, if yes, perform step 4404a, if not, perform step 4404b, step 4403;

a talk-holding timer is set for the calling user, step 4404a;

the multifunction resource panel is connected, any possible busy tone transmitted from the line is detected, step 4404b;

the calling user is entered a talk state, step 4500;

when the talk timer for the calling party times out or the multifunction resource detects a busy tone, step 4501;

the front call control process module controls the loop relay panel to simulate hanging-up the phone by the calling user, step 4502;

after the simulated user interface detects the hanging-up, the front call control process module controls to release the calling user, step 4503, this process is in a normal call service flowchart of the switch; then, the calling user is entered an idle state of step 4100.

For any specified setup for a flowchart in the call test process, the present invention does not limit to the above embodiments and various modifications can be performed by system resources of the present invention.

INDUSTRIAL APPLICABILITY

After a user buys the SPC switch equipment, the user can get a call test instrument built in the switch without paying any additional cost or with adding very low cost;

This built-in simulated user call test system can really simulate various testes by current standard commercial user simulating callers, and its result is equal to the test result of standard commercial user simulating callers. First, their principles are same, all perform a test by initiating a call on a user line, simulating dial and talking with the called party, and by transmitting pass detection tone, receiving and judging the form of the pass detection tone. Because of the same principle, the test results are comparable. Second, both can manually set related parameters, such as a dial interval, time-length of talking, first hanging-up by the calling or called party, interval between two calls. Further, both can perform statistical process on call test results in details, for example, overall times of initiation, success times of initiation, failure times, and reasons for failures, which can help to analyze and locate any possible problems in the system.

When the test call is in a large number, a setup may be set freely, in which the biggest initiation call user number may be only limited by an user number permitted for simultaneous initiation by the switch;

on-line test can be conveniently performed, which helps to find any failure in the system in time, and obtains much more detailed statistics on reasons of the failures than commercial call testers, and facilitates testing and locating failures; and a visible image interface may be used as a human-machine interface, and it is designed in a software module with a flexible configuration, directly displaying results, and more flexibility and operability.

That which is claimed:

1. A simulated user call test system, characterized in that the simulated user call test system is built in a digital stored program control switch, and comprises a back process module, a front call control process module and a hardware subsystem for performing a call test, wherein:

the back process module runs on a maintaining platform of the switch for providing an operation interface for a user to perform a call test setup, receives call test result data transmitted by the front call control process module, and performs display and statistical processes;

the front call control process module is included in a main control module of the switch to receive call test setup parameters provided by the back process module, control the hardware subsystem to perform a call test process according to a flowchart and user parameters set, and report a result of the call test to the back process module;

the hardware subsystem comprises function process units of the digital stored program control switch to receive instructions from the front call control process module, perform tests comprising at least one of the following: picking-up or hanging-up phones, detecting signaling tone, dialing, sending a test tone, or talking; and report test results to the front call control process module, and wherein the hardware subsystem further comprises a loop relay panel used for simulating picking-up or hanging-on a phone in a calling or called user terminal and dial function of dial pulse form by the calling user.

2. The simulated call test system according to claim 1, wherein the hardware subsystem further comprises a simulated user interface panel, an interface panel control process element, and a multifunction resource process panel, wherein:

the multifunction resource process panel comprises:

a signal tone detection process module for detecting whether tones in the switch are normal or not in the call test process;

a signal tone process module for providing playing of signal tones required in the call test process; and a dual tone multiple frequency generator for simulating dial function of user terminal in a dual tone multi frequency form;

the simulated user interface panel connects to the loop relay panel by a user line for providing a simulated user interface in the switch, and initiating a call on the user line when testing; and the interface panel control process element is provided various timers required in the call test, and connected to the loop relay panel, the simulated user interface panel and the multifunction resource process panel with highway wires, on which inter-working and exchanging is completed by a network, and a control between the front call control process module and resources of the hardware subsystem is realized in a message-driven form by such interface.

3. A test method, characterized in that the test method is implemented within a digital stored program control switch which includes a back process module, a front call control process module and a hardware subsystem for performing a call test, the test method comprising:

setting related information for a calling and a called user in a simulated call test through a human-machine interface of a back process module by a tester;

transmitting call parameters to a front call control process module through a message channel by the back process module;

initiating the call test after the front call control process module obtains related call test process parameters;

sending, by the front call control process module, instructions to a hardware subsystem within the switch according to a call test control flowchart set, wherein the call test control flowchart comprises:

(1) first simulating picking-up a phone by a user in an idle state, and entering a state of waiting for dial tone;

(2) after detecting the dial tone, preparing for sending the number, and entering a state of dial;

(3) sending the number called in a dual tone multi frequency or dial pulse form according to a setup, after sending the number, initiating a pass detection timer, and entering a state of waiting for pass;

(4) receiving the number, analyzing the number, searching for a called user, and feeding ringing back tone by a normal call service system in the switch;

(5) if the called user picks up a phone when detecting the ringing, sending a pass test tone and setting the pass detection timer, and entering a state of a pass test;

(6) after the calling user receives the pass test tone, sending another pass test tone, and, if the calling user is set first to hang up, setting a talk timer, if not, detecting whether there is a busy tone, and, entering a state of talking;

(7) after the called user receives the pass test tone, if the calling user is set first to hang up, detecting whether there is a busy tone, if not, setting a talk timer, and entering a state of talking;

(8) when the talk timers of the calling or called users time out or after a busy tone is detected, simulating user hanging up, and releasing the calling and the called users, thereby a call process is completed;

completing the test process according to the instructions from the front call control process module, and reporting a test result to the front call control process module by the hardware subsystem;

processing the call test result, and collecting to the back process module by the front call control process module; and displaying the result by the back process module.

4. The test method according to claim 3, wherein when sending the number, a dial timer is initiated, after the timer times, one digit of the number called is transmitted according to a dial pulse or a dual tone multi frequency form set, until all digits are transmitted.

5. The test method according to claim 3, wherein in element (6), if the pass detection timer for the calling user times out, a pass test tone is also transmitted, if the calling user is set first to hang up, a talk timer is set, otherwise, whether there is a busy tone is detected; in element (7), when the pass detection timer for the called user times out, if the calling user is set first to hang up, whether there is a busy tone is detected, otherwise, a talk timer is set.

6. The simulated call test system according to claim 2, wherein the tones comprise at least a dial tone or busy tone.

* * * * *